(12) United States Patent
Komatsu

(10) Patent No.: US 7,000,835 B2
(45) Date of Patent: *Feb. 21, 2006

(54) NONCONTACT TYPE IC CARD AND SYSTEM THEREOF

(75) Inventor: Hitoshi Komatsu, Saitama (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 11/071,250

(22) Filed: Mar. 4, 2005

(65) Prior Publication Data

US 2005/0145702 A1    Jul. 7, 2005

Related U.S. Application Data

(62) Division of application No. 10/663,913, filed on Sep. 17, 2003.

(30) Foreign Application Priority Data

Dec. 25, 2002  (JP) ............................. 2002-374712

(51) Int. Cl.
*G06K 5/00* (2006.01)
(52) U.S. Cl. ............. 235/437; 340/825.34; 340/825.31
(58) Field of Classification Search ................ 235/492, 235/494, 488, 382, 382.5; 340/825.34, 825.31
See application file for complete search history.

(56) References Cited

U.S. PATENT DOCUMENTS

| 5,418,358 A | 5/1995 | Bruhnke et al. |
| 5,945,920 A | 8/1999 | Maletsky |
| 6,070,804 A * | 6/2000 | Miyamoto .................. 235/494 |

FOREIGN PATENT DOCUMENTS

JP    3-18218    7/1986

OTHER PUBLICATIONS

Search Report, mailed Apr. 23, 2004, from the European Patent Office for Patent Application No. 03020890.4-1248-.

* cited by examiner

*Primary Examiner*—Ahshik Kim
*Assistant Examiner*—Daniel A. Hess
(74) *Attorney, Agent, or Firm*—Pillsbury Winthrop Shaw Pittman, LLP

(57) ABSTRACT

In a noncontact type IC card, writing of data is executed when a voltage level of an operating voltage generated from a received power wave is a level suitable for the writing of the data to a nonvolatile memory, and it is recognized that the data write operation is normally terminated when the voltage level of the operating voltage is the level suitable for the writing of the data to the nonvolatile memory even after the writing of the data.

8 Claims, 4 Drawing Sheets

NONCONTACT TYPE IC CARD AND SYSTEM THEREOF

CROSS-REFERENCE TO RELATED APPLICATION

This application is a divisional of U.S. patent application Ser. No. 10/663,913, filed Sep. 17, 2003, which in turn claims priority to Japanese Patent Application No 2002-374712 filed Dec. 25, 2002, both of which are incorporated herein in their entirety by reference.

BACKGROUND OF THE INVENTION

1. Field of the Invention

This invention relates to a noncontact type batteryless IC card which can be used as, for example, a personal identification medium of an entry and exit management device, a resident register card and the like, which performs by receiving a power wave transmitted from a card reader-writer and generating an operating voltage from the received power wave, and which allows data to be written in or read from a rewritable nonvolatile memory by making radio communications with the card reader-writer, and also relates to a system of the noncontact type IC card.

2. Description of the Related Art

Recently, for example, a noncontact type IC card called a radio card has been used as a personal identification medium of an entry and exit management device. The noncontact type IC card storing personal physical characteristic information and the like is distributed to a visitor. The card collates the physical characteristic information by making radio communications with a card reader-writer installed at a room entrance and controls opening and closing of an entrance door.

Such a noncontact type IC card called a radio card is typically in a batteryless type for the purpose of reduction of the battery exchange operation, downsizing, decrease in manufacturing costs, extension of life and the like.

Thus, a recent noncontact type IC card is operated to receive a power wave transmitted from the card reader-writer, generate an operating voltage from the received power wave and supply the operating voltage to each section.

Incidentally, in this kind of noncontact type IC card, for example, when data is stored (written) in the nonvolatile memory on the basis of a write instruction transmitted from the card reader-writer, a method of writing the supplied data that should be written in the nonvolatile memory at only one time is employed.

In the conventional method, data is written in the nonvolatile memory even if the noncontact type IC card is under any conditions. However, power supply in this kind of the noncontact type IC card may be remarkably unstable in accordance with the state of the received wave. If the one-time writing is failed, the data may not be stored.

BRIEF SUMMARY OF THE INVENTION

The object of the present invention is to provide a noncontact IC card wherein if the level of the generated operating voltage is unstable, normal data writing can be always implemented by waiting for data writing to a memory.

A noncontact type IC card according to the present invention is configured to receive a power wave sent from an external device to generate an operating voltage and perform writing of data to a memory with the generated operating voltage. The IC card comprises a voltage detecting section which detects a voltage level of the operating voltage generated from the power wave received from the external device, a write executing section which executes the writing of the data to the memory if the voltage level detected by the voltage detecting section is a level at which normal writing to the memory can be performed; and a control section which detects by the voltage detecting section the voltage level of the operating voltage obtained after the writing of the data to the memory executed by the write executing section is terminated, and which executes again the writing of the data to the memory if the detected voltage level of the operating voltage is not a predetermined voltage level.

In addition, a noncontact type IC card of the present invention is configured to receive a power wave sent from an external device to generate an operating voltage and perform writing of data to a memory with the generated operating voltage. The IC card comprises a voltage detecting section which detects a voltage level of the operating voltage generated from the power wave received from the external device, a first checking section which detects the voltage level of the operating voltage by the voltage detecting section and checks whether or not the detected voltage level of the operating voltage is a predetermined voltage level, when the writing of the data to the memory is started, a write executing section which executes the writing of the data to the memory if the first checking section determines that the detected voltage level of the operating voltage is the predetermined voltage level, a second checking section which detects the voltage level of the operating voltage obtained after the writing of the data to the memory is terminated, by the voltage detecting section, and which checks whether or not the detected voltage level is a predetermined voltage level, and a control section which executes again processings of the first checking section, the write executing section and the second checking section after waiting for a predetermined period of time, if the first checking section determines that the voltage level of the operating voltage is not the predetermined voltage level or if the second checking section determines that the voltage level of the operating voltage is not the predetermined voltage level.

Moreover, a noncontact type IC card of the present invention comprises a rewritable nonvolatile memory, an antenna which transmits data to an external device or receives the data therefrom, a power generating section which receives a power wave transmitted from the external device, via the antenna, and generates an operating voltage with the received power wave, a voltage detecting section which detects a voltage level of the operating voltage generated by the power generating section, a first checking section which detects by the voltage detecting section the voltage level of the operating voltage generated by the power generating section and checks whether or not the detected voltage level of the operating voltage is a predetermined voltage level, when a write command of the data from the external device to the nonvolatile memory is received via the antenna, a write executing section which executes the writing of the data to the nonvolatile memory if the first checking section determines that the detected voltage level of the operating voltage is the predetermined voltage level, a second checking section which detects the voltage level of the operating voltage obtained after the writing of the data to the nonvolatile memory executed by the write executing section is terminated, by the voltage detecting section, and which checks whether or not the detected voltage level is a predetermined voltage level, and a control section which executes again processings of the first checking section, the write executing section and the second checking section after waiting for a predetermined period of time, if the first checking section determines that the voltage level of the operating voltage is not the predetermined voltage level or if the second checking section determines that the voltage level of the operating voltage is not the predetermined voltage level.

A noncontact type IC card system of the present invention comprises an external device which requests writing of data, and a noncontact type IC card which performs writing of the data in response to the request from the external device. The external device comprises a sending section which sends a power wave for operations to the IC card, and a transmitting section which transmits a write command to the IC card receiving the power wave for operations sent from the sending section. The IC card comprises a voltage detecting section which detects a voltage level of an operating voltage generated from the power wave received from the external device, a first checking section which detects by the voltage detecting section the voltage level of the operating voltage and checks whether or not the detected voltage level of the operating voltage is a predetermined voltage level, when the writing of the data to the memory is started in response to the write command received from the external device, a write executing section which executes the writing of the data to the memory if the first checking section determines that the detected voltage level of the operating voltage is the predetermined voltage level, a second checking section which detects the voltage level of the operating voltage obtained after the writing of the data to the memory is terminated, by the voltage detecting section, and which checks whether or not the detected voltage level is a predetermined voltage level, and a control section which executes again processings of the first checking section, the write executing section and the second checking section after waiting for a predetermined period of time, if the first checking section determines that the voltage level of the operating voltage is not the predetermined voltage level or if the second checking section determines that the voltage level of the operating voltage is not the predetermined voltage level.

In addition, a noncontact type IC card system of the present invention comprises an external device which requests writing of data, and a noncontact type IC card which performs writing of the data in response to the request for the writing of data from the external device. The external device comprises a sending section which sends a power wave for operations to the IC card, and a transmitting section which transmits a data write command to the IC card receiving the power wave for operations sent from the sending section. The IC card comprises a rewritable nonvolatile memory, an antenna which transmits data to an external device or receives the data therefrom, a power generating section which receives a power wave transmitted from the external device, via the antenna, and generates an operating voltage with the received power wave, a voltage detecting section which detects a voltage level of the operating voltage generated by the power generating section, a first checking section which detects by the voltage detecting section the voltage level of the operating voltage generated by the power generating section and checks whether or not the detected voltage level of the operating voltage is a predetermined voltage level, when a write command of the data from the external device to the nonvolatile memory is received via the antenna, a write executing section which executes the writing of the data to the nonvolatile memory if the first checking section determines that the detected voltage level of the operating voltage is the predetermined voltage level, a second checking section which detects the voltage level of the operating voltage obtained after the writing of the data to the nonvolatile memory executed by the write executing section is terminated, by the voltage detecting section, and which checks whether or not the detected voltage level is a predetermined voltage level, and a control section which executes again processings of the first checking section, the write executing section and the second checking section after waiting for a predetermined period of time, if the first checking section determines that the voltage level of the operating voltage is not the predetermined voltage level or if the second checking section determines that the voltage level of the operating voltage is not the predetermined voltage level.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

First and second embodiments of the present invention will be described below with reference to drawings.

Figure 1:
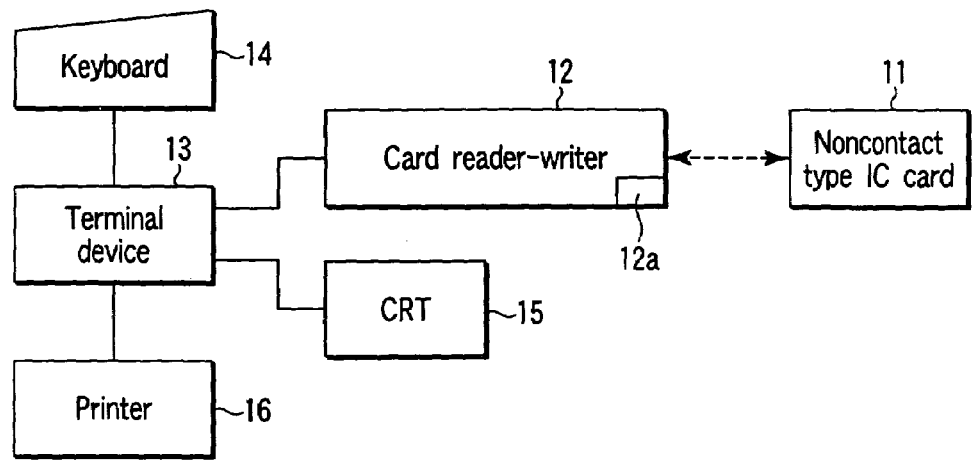
FIG. 1 is a block diagram showing an example of a configuration of a noncontact type IC card system using a noncontact type IC card according to embodiments of the present invention.

FIG. 1 shows an example of a configuration of a noncontact type IC card system using a noncontact type IC card according to first and second embodiments of the present invention.

The noncontact type IC card system comprises a noncontact type IC card 11, a card reader-writer 12, a terminal device 13, a keyboard 14, a CRT display section 15, a printer 16 and the like.

The noncontact type IC card 11 and the card reader-writer 12 make radio communications with each other. The terminal device 13 such as a personal computer is connected to the card reader-writer 12. The keyboard 14, a CRT display section 15, a printer 16 and the like are connected to the terminal device 13.

The card reader-writer 12 has a transmitter-receiver section 12a composed of a transmitter-receiver circuit and an antenna to transmit and receive a radio wave for radio communications, and the like. For example, the card reader-writer 12 sends a power wave for operations (a radio wave for power supply) to the noncontact type IC card 11 by the transmitter-receiver section 12a, transmits various operation commands such as a write command and the like, and receives data such as a command response and the like from the noncontact type IC card 11.

Figure 2:
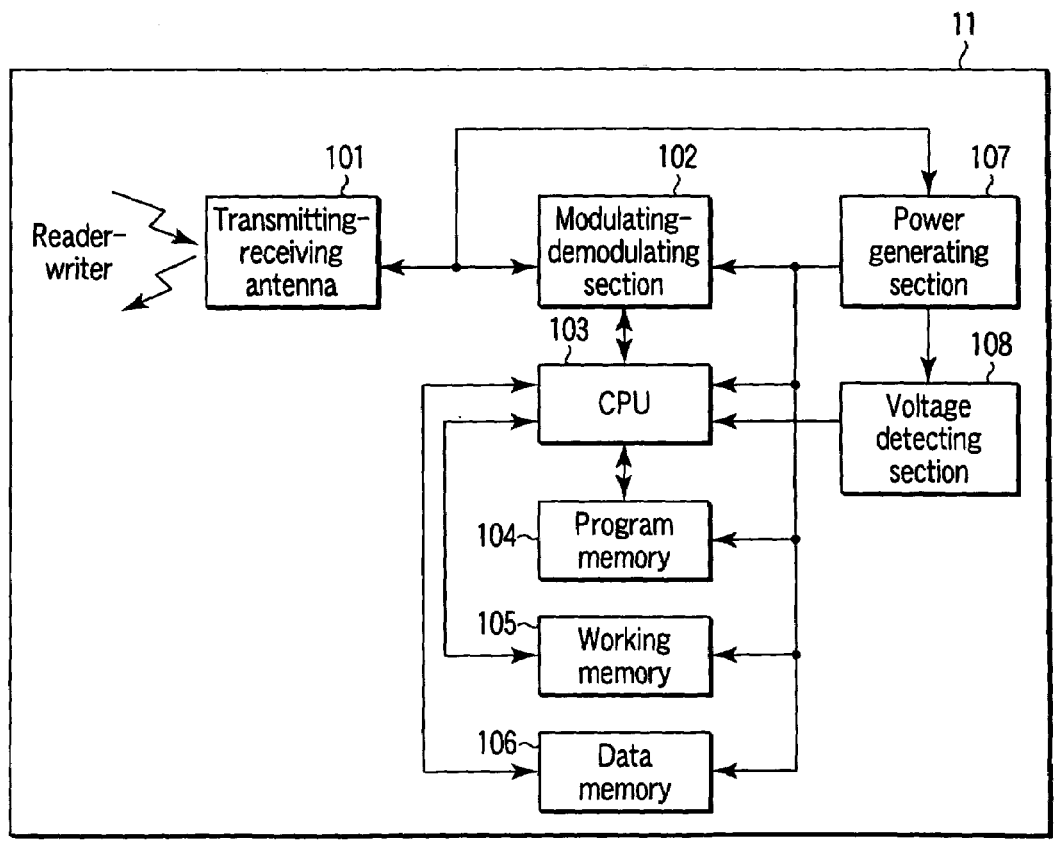
FIG. 2 is a block diagram schematically showing a configuration of the noncontact type IC card according to the embodiments of the present invention.

FIG. 2 is a block diagram showing a configuration of the noncontact type IC card 11.

As shown in FIG. 2, the noncontact type IC card 11 has a transmitting-receiving antenna 101, a modulating-demodulating section 102, a CPU (central processing unit) 103, a program memory 104, a working memory 105, a data memory 106, a power generating section 107, and a voltage detecting section 108.

The transmitting-receiving antenna 101 is an antenna which transmits data to the card reader-writer 12 or receives data therefrom.

The modulating-demodulating section 102 modulates the transmitted data or demodulates the received data.

The CPU 103 performs various data processing and total control.

The program memory 104 is composed of, for example, a non-rewritable nonvolatile memory such as a mask ROM. Data is written in the program memory 104 when the noncontact type IC card is fabricated or issued. For example, various control programs that are executed by the CPU 103 are stored in the program memory 104.

The working memory 105 is composed of, for example, a rewritable volatile memory such as a RAM. Data in the working memory 105 is cleared when the power supply is turned off. The working memory 105, for example, temporarily stores transmitted and received data, control data for operations, setting data and the like at various processes.

The data memory 106 is composed of, for example, a nonvolatile memory such as an EEPROM in which memory contents are rewritable. The data memory 106 is used to store various data. For example, personal information of a holder of the noncontact type IC card, control data supplied from the card reader-writer 12 or the like is stored in the data memory 106. The data in the data memory 106 can be rewritten under control of the CPU 103. For example, if a data write command (a data write instruction) is received from the card reader-writer 12, the data is written in the data memory 106 by the CPU 103.

The power generating section 107 generates a DC voltage from the power wave from the card reader-writer 12 which is received by the transmitting-receiving antenna 101. The voltage generated at the power generating section 107 supplied to each section inside the noncontact type IC card as an operating voltage. The power generating section 107 has a rectifier circuit and the like. The power generating section 107 also generates a stabilized DC voltage by rectifying and smoothing the power wave received by the transmitting-receiving antenna 101, by the rectifier circuit.

The voltage detecting section 108 detects levels of the DC voltages generated at the power generating section 107.

Each of the sections 102 to 108 other than the transmitting-receiving antenna 101 is composed of one IC chip (or a plurality of IC chips), and is embedded in the card body together with the transmitting-receiving antenna 101.

Next, the first embodiment will be explained.

The first embodiment is an operation example which is applied to the noncontact type IC card 11 shown in FIG. 2. In the first embodiment, the operation example of writing the data to the data memory 106, in the IC card 11, will be explained.

In the first embodiment, the IC card 11 performs setting on the basis of various set values which are preliminarily stored in the data memory 106 and executes writing the data to the data memory 106, in response to the data write command from the card reader-writer 12, in the system shown in FIG. 1.

Figure 3:
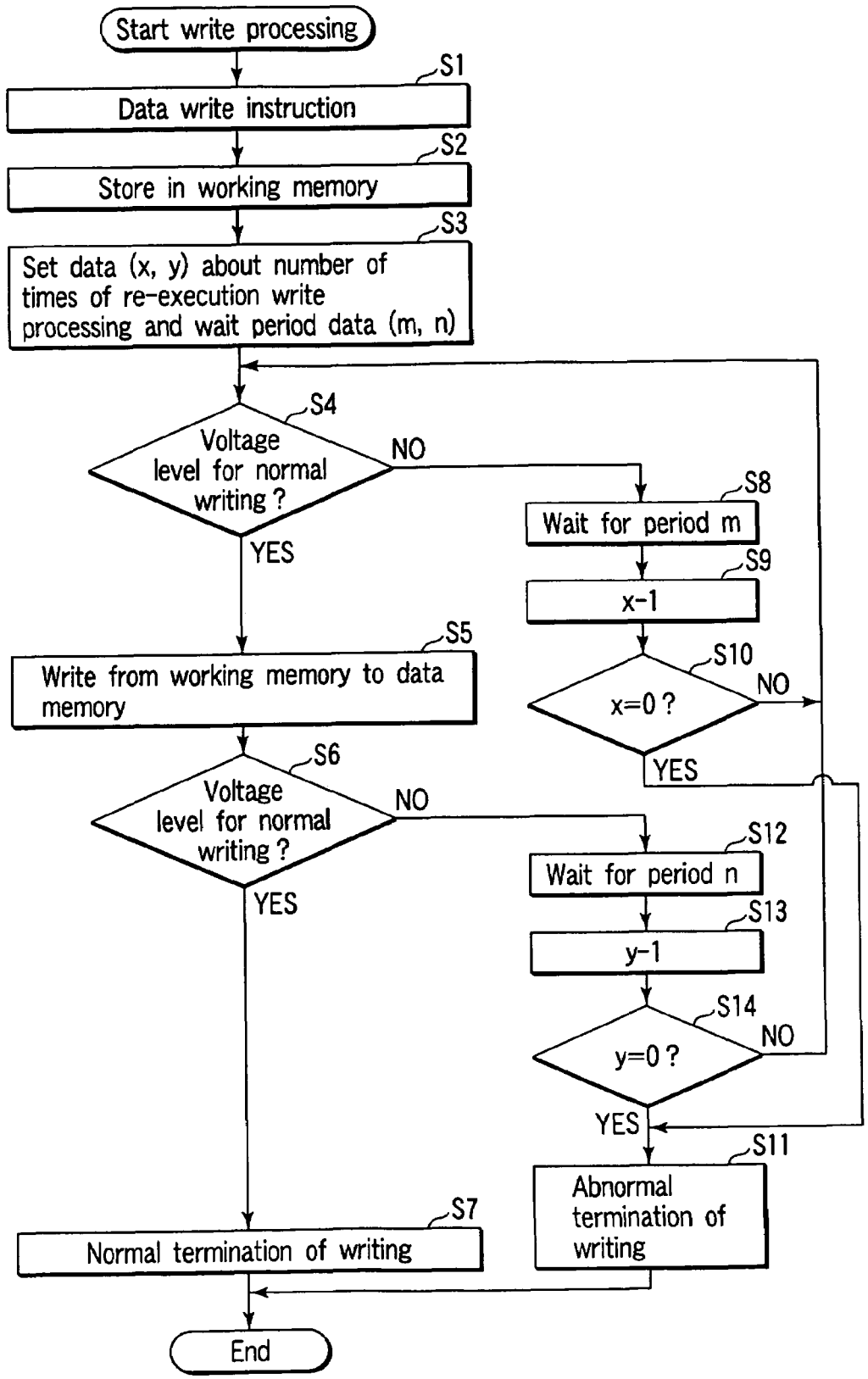
FIG. 3 is a flowchart for explanation of write operations of data in a data memory, according to a first embodiment of the present invention.

FIG. 3 is a flowchart for explanation of write processing of data in the data memory 106, as the first embodiment.

First, it is assumed that the card reader-writer 12 and the IC card 11 can make communications with each other. In this state, if the card reader-writer 12 transmits the data write command, the CPU 103 of the IC card 11 receives the write command via the transmitting-receiving antenna 101, the modulating-demodulating section 102 and the like (step S1).

When the CPU 103 of the IC card 11 receives the data write command transmitted from the card reader-writer 12 (step S1), the CPU 103 temporarily stores the write data added to the write instruction in the working memory 105 (step S2).

Next, the CPU 103 sets data (x, y) about number of times of re-executing write processing, responding to the data write instruction, and wait period data (m, n) (step S3). The data (x, y) represents a limit of the number of times of re-executing the write processing responding to the data write instruction. The data (m, n) represents the wait period when the write processing is re-executed. In the first embodiment, the data (x, y) and data (m, n) is preliminarily stored in the data memory 106. That is, the first embodiment is on the precondition that the data (x, y) and (m, n) is stored in the data memory 106, at least, before the data write processing is started (the data write command is received from the card reader-writer).

Therefore, in the first embodiment, when the CPU 103 receives the data write instruction, the CPU 103 reads the data (x, y) which is preliminarily stored in the data memory 106 and stores the data in the working memory 105. Thus, the data (x, y) responding to the data write processing is set. Similarly, in the first embodiment, when the CPU 103 receives the data write instruction, the CPU 103 reads the data (m, n) which is preliminarily stored in the data memory 106 and stores the data in the working memory 105. Thus, the data (m, n), responding to the data write processing, is set.

When the CPU 103 sets the data (x, y) responding to the data write instruction and the data (m, n), the CPU 103 detects the level of the operating voltage which is generated at the power generating section 107, by the voltage detecting section 108. On the basis of a result of the detection of the voltage detecting section 108, the CPU 103 checks whether or not the level of the operating voltage generated at the power generating section 107 is a level at which normal writing to the data memory 106 can be performed (step S4).

The processing of step S4 is a function which can be implemented by the CPU 103 and also is a processing which serves as a first checking section. The processing of step S4 is called a pre-writing check in the following explanations.

Next, if the level of the operating voltage generated at the power generating section 107 is the level at which normal writing in the data memory 106 can be performed, as a result of the check at step S4, the CPU 103 executes the processing of writing the write data temporarily stored in the working memory 105 to the data memory 106 (step S5). The processing of step S5 is a function which can be implemented by the CPU 103 and also is a processing which serves as a write executing section.

Next, when the CPU 103 terminates the write processing of step S5, the CPU 103 detects again the level of the operating voltage generated at the power generating section 107 by the voltage detecting section 108. On the basis of the result of the detection of the voltage detecting section 108, the CPU 103 checks whether or not the level of the operating voltage generated at the power generating section 107 is a level at which normal writing to the data memory 106 can be performed (step S6). The processing of step S6 is a function which can be implemented by the CPU 103 and also is a processing which serves as a second checking section. The processing of step S6 is called a post-writing check in the following explanations.

Next, if the level of the operating voltage generated at the power generating section 107 is a level at which normal writing to the data memory 106 can be performed, as a result of the check at step S6, the CPU 103 recognizes that the write processing has been normally terminated and terminates the write processing (step S7).

If the CPU 103 determines as a result of the check at step S4 that the level of the operating voltage generated at the power generating section 107 is not a level at which normal writing to the data memory 106 can be performed, the CPU 103 waits for predetermined period m (step S8). At this time, the CPU 103 sets the number of times x of re-executing the write processing that has been previously set to "−1" (step S9).

Next, the CPU 103 checks whether or not the number of times x is "0" (step S10). If the CPU 103 determines that the number of times x is not "0", the CPU 103 returns to step S4 and performs the processing again from the pre-writing check. If the CPU 103 determines as a result of checking at step S10 that the number of times x is "0", the CPU 103 recognizes that the write processing could not be normally terminated (step S11) and terminates the processing.

If the CPU 103 determines as a result of checking at step S6 that the level of the operating voltage generated at the power generating section 107 is not a level at which normal writing to the data memory 106 can be performed, the CPU 103 waits for predetermined period n (step S12). At this time, the CPU 103 sets the number of times y of re-executing the write processing that has been previously set to "−1" (step S13).

Next, the CPU 103 checks whether or not the number of times y is "0" (step S14). If the CPU 103 determines that the number of times y is not "0", the CPU 103 returns to step S4 and performs the processing again from the pre-writing check. If the CPU 103 determines as a result of checking at step S14 that the number of times y is "0", the CPU 103 recognizes that the write processing could not be normally terminated (step S11) and terminates the processing.

In the radio card 11 of the present invention, as described above, the level of the operating voltage is checked before the data is written to the data memory 106. If the level of the operating voltage is normal, the data is written to the data memory 106. After that, the level of the operating voltage is checked again. If the level of the operating voltage is normal, it is recognized that the write operation also has been normally terminated, and the write processing is terminated.

If the check of the operating voltage level before the write operation indicates that the voltage level is low, the CPU 103 returns to the initial write operation after waiting for a certain period (m), and performs again the processing from the pre-writing check.

Even if the check of the operating voltage level after the write operation indicates that the voltage level is low, the CPU 103 returns to the initial write operation after waiting for a certain period (n), and performs again the processing from the pre-writing check.

In the first embodiment, as described above, the data (x, y) and (m, n) is stored in advance in specific areas within the data memory 106, respectively. Therefore, in the first embodiment, the data (x, y) and the data (m, n) can be changed by rewriting the data in the data memory 106.

As explained above, in the noncontact type IC card according to the first embodiment, if the voltage level of the operating voltage generated from the power wave received from the card reader-writer does not become stable, the write operation of the actual data into the data memory composed of the nonvolatile memory is not executed until the operating voltage generated from the received power wave reaches a predetermined voltage level.

Therefore, in the first embodiment, it is possible to wait for the actual write operation until the operating voltage generated from the received power wave reaches the voltage level at which the data can be written to the data memory composed of the nonvolatile memory. Thus, in the first embodiment, the data can be always written to the data memory at the operating voltage of an appropriate voltage level, and normal writing of the data can be implemented.

In addition, in the noncontact type IC card according to the first embodiment, the writing of the data to the data memory composed of the nonvolatile memory is performed with the operating voltage generated by the power wave received from the card reader-writer. If the operating voltage is not at a predetermined voltage level after the writing of the data is terminated. the CPU 103 re-executes the writing of the data after waiting for a predetermined period.

Thus, in the first embodiment, if the voltage level of the operating voltage is not a predetermined voltage level when the writing of the data to the data memory composed of the nonvolatile memory is terminated, the writing of the data can be re-executed. As a result, write error of the data to the data memory can be prevented and the writing of the data thereto can be certainly executed, in the first embodiment.

Therefore, in the noncontact type IC card of a batteryless type, according to the first embodiment, the writing can be executed at an opportunity suitable for the writing of data to the nonvolatile memory, by monitoring the voltage level of the operating voltage generated from the received power wave.

Moreover, it is possible to recognize that the write operation of the data to the nonvolatile memory has been normally terminated, by monitoring the voltage level of the operating voltage after the writing of data to the nonvolatile memory.

In the above-described first embodiment, the operations of the noncontact type IC card 11 have been explained. In the following second and third embodiments, operations of a noncontact type IC card system composed of the card reader-writer 12 and the IC card 11 will be explained.

First, the second embodiment will be explained.

The second embodiment is a first operation example applied to the noncontact type IC card system composed of the card reader-writer 12 and the noncontact type IC card 11 as shown in FIG. 1.

In the second embodiment, when the IC card 11 is started (when the power is turned on), setting data for the write processing of the data to the data memory 106, which is prestored in the data memory 106, is read and set. That is, in the second embodiment, when the IC card receives the power wave for operations from the card reader-writer 12, the IC card performs initialization (start operations) of its own card, reads the setting data used for the write processing of the data to the data memory 106, which is prestored in the data memory 106, and sets the data.

Figure 4:
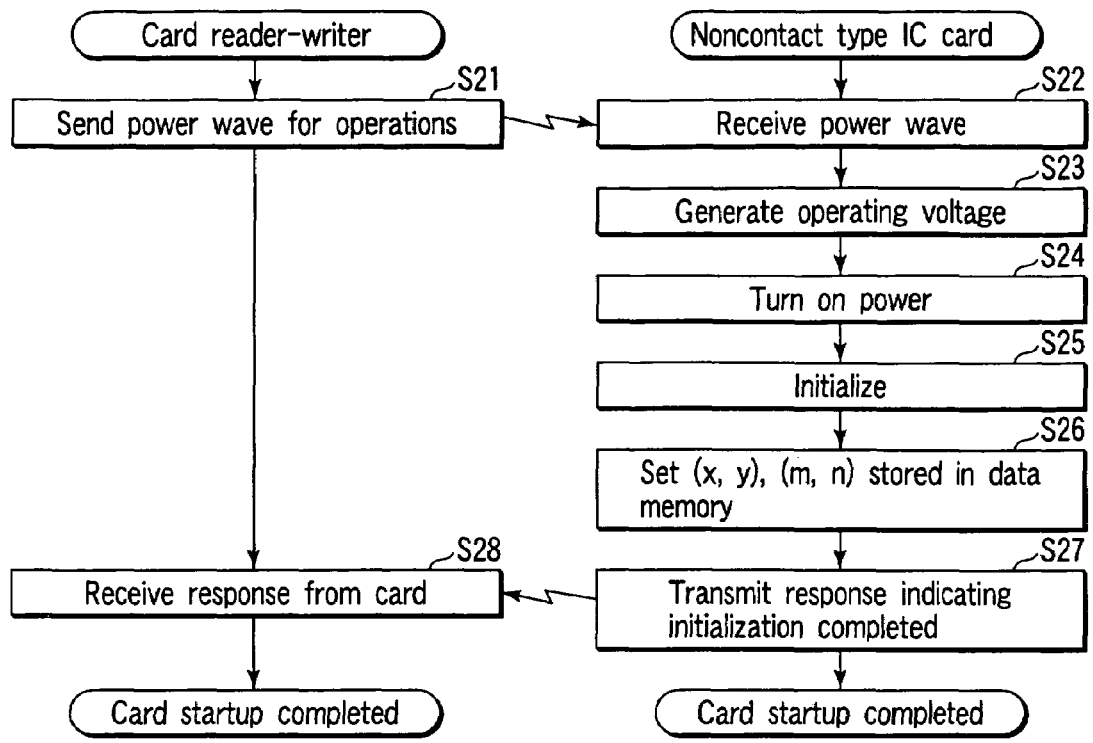
FIG. 4 is a flowchart for explanation of operations at the start of a noncontact type IC card according to a second embodiment of the present invention.
Figure 5:
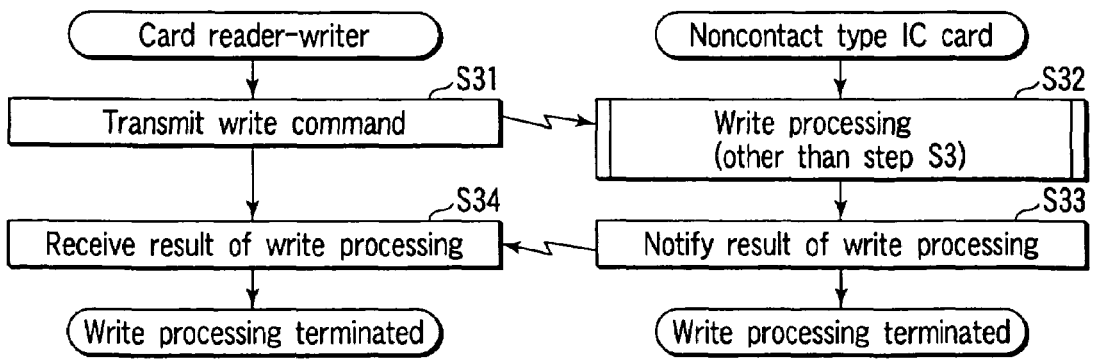
FIG. 5 is a flowchart for explanation of operations at the write processing, according to the second embodiment of the present invention.

FIGS. 4 and 5 are flowcharts for explanation of operations of the second embodiment.

FIG. 4 is a flowchart for explanation of the operations of the second embodiment which sets the data used for the write processing to the data memory 106 when the IC card is started. FIG. 5 is a flowchart for explanation of the operations of the IC card started by the operations shown in FIG. 4 and the operations of the card reader-writer 12.

First, the IC card 11 is made to approach a predetermined communication position of the card reader-writer 12. Then, a magnetic field is generated between the IC card 11 and the card reader-writer 12, such that the IC card 11 can receive the radio wave from the card reader-writer 12. In this state, the card reader-writer 12 sends the power wave for operations by the transmitter-receiver section 12a composed of a transmitter-receiver circuit and an antenna (step S21).

On the other hand, the IC card 11 receives the power wave sent from the card reader-writer 12, by the transmitting-receiving antenna 101 (step S22), and generates an operating voltage by the power generating section 107 (step S23). When the operating voltage is generated from the power wave transmitted from the card reader-writer 12, the power generating section 107 supplies the generated operating voltage to each section in the IC card 11. Thus, the power of the IC card 11 is turned on (step S24).

When the power of the IC card 11 is turned on, the CPU 103 performs initialization (startup) of the entire body of the IC card on the basis of an initialization program stored in the program memory 104 (step S25).

When the initialization is terminated, the CPU 103 reads the data (x, y) about the number of times of re-executing write processing and the wait period data (m, n), from the data memory 106, as the setting data used for the write processing of the data to the data memory 106, and stores the data into the working memory 105. Thus, the data (x, y) and (m, n) is set in the IC card 11, as the setting data used for the write processing of the data to the data memory 106 (step S26).

It is assumed here that the setting data used for the write processing such as the data (x, y) and the data (m, n) is preliminarily stored in the data memory 106.

When the setting data used for the write processing is set, the CPU 103 transmits a response which indicates completion of the initialization of the IC card 11 to the card reader-writer 12, by the modulating-demodulating section 102 and the transmitting-receiving antenna 101 (step S27).

When the card reader-writer 12 receives the response transmitted from the IC card 11 at step S27, the card reader-writer 12 becomes capable of making communications with the IC card 11 (step S28). In this state, the card reader-writer 12 can transmit commands (operation commands) to request various operations to the IC card 11.

That is, when steps S21 to S28 have been completed, the card reader-writer 12 becomes capable of supplying the write command to request the writing of the data to the data memory 106, to the IC card 11.

Next, operations in a case where the data write command (data write instruction) is transmitted from the card reader-writer 12 to the IC card 11 when steps S21 to S28 have been completed, will be explained.

First, as shown in FIG. 5, the card reader-writer 12 transmits the data write command to the IC card 11 (step S31). The data write command is supplied to the CPU 103 via the transmitting-receiving antenna 101 and the modulating-demodulating section 102 of the IC card 11. Thus, the CPU 103 executes the write processing of the data to the data memory 106 as explained in the first embodiment (step S32).

In the second embodiment, however, the setting data used for the write processing of the data to the data memory 106 is set when the IC card 11 is started (when the power is turned on). For this reason, in the second embodiment, the write processing of the data to the data memory 106 is executed on the basis of the data which has already been set. That is, the processings other than step S3 (steps S1–S2 and steps S4–S11) shown in FIG. 3 are executed as a processing of step S32.

When the write processing as described above has been terminated, the CPU 103 transmits the data indicating a result of the write processing to the card reader-writer 12, as a response to the write command (step S33). In the write processing of step S32, for example, the CPU 103 transmits the data indicating normal termination if the writing is normally terminated, or the data indicating abnormal termination if the writing is abnormally terminated.

When the card reader-writer 12 receives such data indicating a result of the write processing from the IC card 11 (step S34), the write processing of the data in the IC card system is completed.

According to the second embodiment, as described above, when the IC card starts up by receiving the power wave from the card reader-writer, the IC card sets the data used for the write processing of the data together with the initialization. In other words, the data used for the write processing of the data is set as one of initializing processings which start up the IC card, in the second embodiment.

Thus, the data used for the write processing of the data does not need to be set until the power is turned off, in the IC card which is once started. For example, if a plurality of data write commands are executed after the startup, setting the data for each of the write commands does not need to be executed. Therefore, the processing time in the IC card system can be reduced.

Next, the third embodiment will be explained.

The third embodiment is a second operation example applied to the noncontact type IC card system composed of the card reader-writer 12 and the noncontact type IC card 11 as shown in FIG. 1.

On the basis of the setting data transmitted from the card reader-writer 12 to the noncontact type IC card 11 together with the data write command, various data used for the write processing of data to the data memory 106 of the IC card is set, in the third embodiment.

That is, in the third embodiment, the card reader-writer 12 transmits the setting data used for the write processing of data to the data memory 106 of the IC card, together with the data write command. The IC card receives the setting data transmitted from the card reader-writer 12 together with the data write command, and sets the data used for the write processing of data to the data memory 106.

Figure 6:
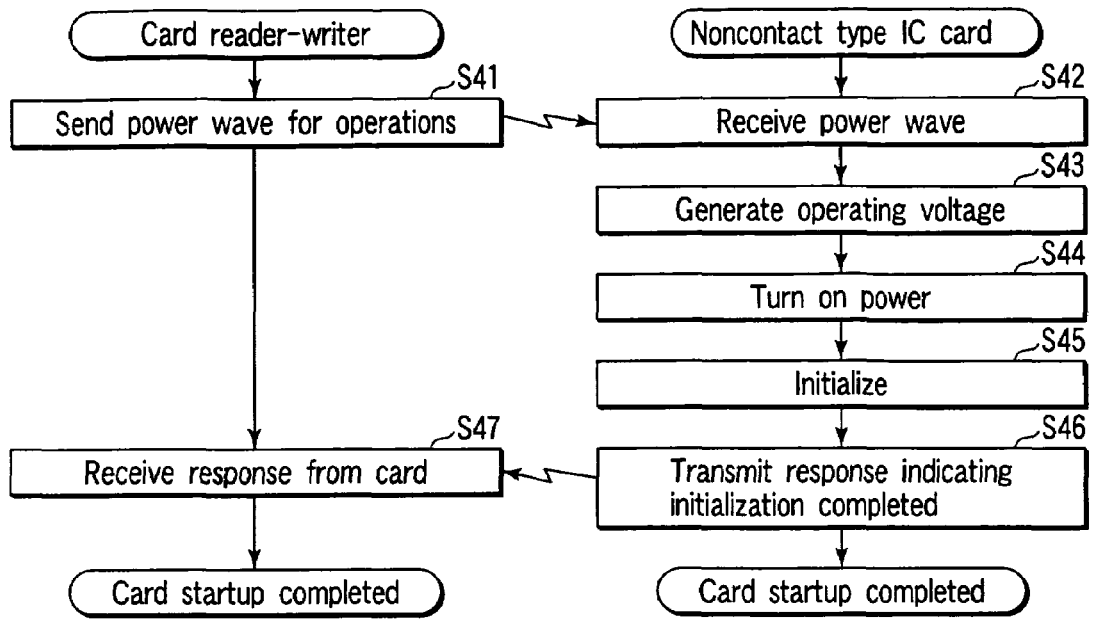
FIG. 6 is a flowchart for explanation of operations at the start of a noncontact type IC card according to a third embodiment of the present invention.
Figure 7:
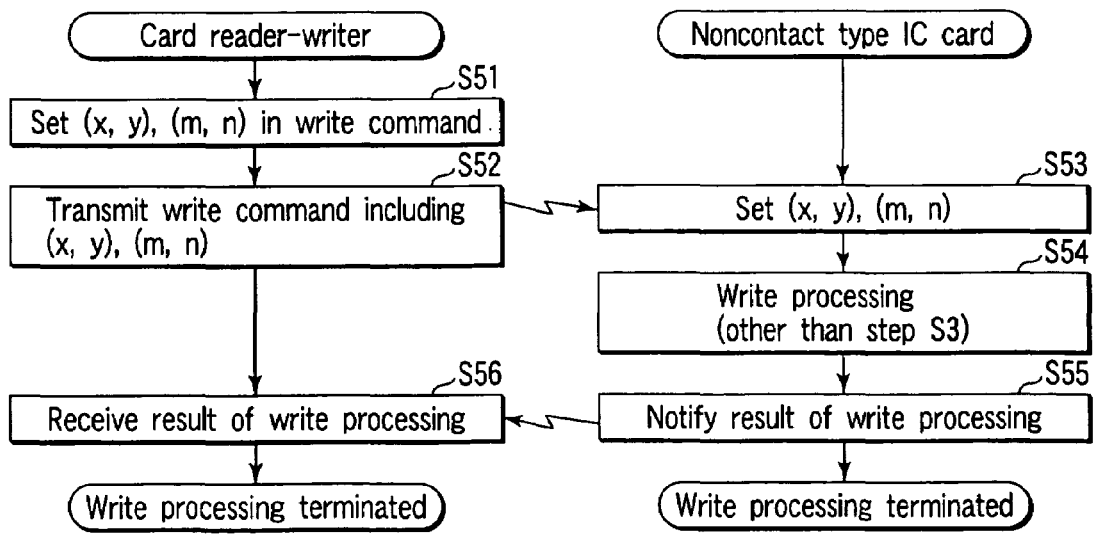
FIG. 7 is a flowchart for explanation of operations at the write processing, according to the third embodiment of the present invention.

FIGS. 6 and 7 are flowcharts for explanation of the operations of the third embodiment.

FIG. 6 is a flowchart for explanation of the operations at the start of the IC card. FIG. 7 is a flowchart for explanation of write operations in the third embodiment, made by the IC card 11 started by the operations of FIG. 6 and the card reader-writer 12.

In the operations at the start of the IC card 11 in the third embodiment, as shown in FIG. 6, setting the data is excluded from the operations at the start of the IC card 11, in the second embodiment, as shown in FIG. 4. That is, the operations at the start of the IC card 11 in the third embodiment, as represented at steps S41–S47 of FIG. 6, are the same as those in the second embodiment, as represented at steps S21–S25 and S27–S28 of FIG. 4. Therefore, the detailed descriptions of steps S41–S47 of FIG. 6 will be omitted.

When the processings of steps S41–S47 have been terminated, the IC card 11 and the card reader-writer 12 become capable of making communications with each other. In this state, the card reader-writer 12 can transmit commands (operation commands) to request various operations such as the data write command to the IC card 11.

The card reader-writer 12 transmits the data write command to the IC card 11, and the write processing of the noncontact type IC card system as shown in FIG. 7 is started.

That is, the card reader-writer 12 first sets the setting data used for the write processing of data to the data memory 106 together with the data which should be written in the data memory 106, in the data write command (step S51). For example, the data (x, y) and (m, n) is set in the write command as the setting data.

The setting data such as the data (x, y) and the data (m, n) is set by the terminal device 13 connected to the card reader-writer 12. That is, the setting data such as the data (x, y) and the data (m, n) which is to be set in the write command can be changed by the terminal device 13 connected to the card reader-writer 12.

Thus, the setting data which is to be set in the write command by the operations using the keyboard 14 or the like (the setting data used for the write processing of the data in the IC card) can easily be changed in the third embodiment.

If the data write command including the setting data is generated at step S51, the card reader-writer 12 transmits the write command to the IC card 11 by the transmitter-receiver section 12a (step S52).

When the data write command including the setting data is transmitted from the card reader-writer 12, the IC card 11 receives the write command by the transmitting-receiving antenna 101 and the modulating-demodulating section 102.

When the write command is received, the CPU 103 of the IC card 11 extracts the setting data (data (x, y) and data (m, n)) included in the write command and stores the extracted data to the working memory 105.

Thus, the data (x, y) and the data (m, n) is set as the setting data used for the write processing of data to the data memory 106, in the IC card 11 (step S53).

When the setting of the setting data (data (x, y) and data (m, n)) has been completed at step S53, the CPU 103 executes the write processing of data to the data memory 106 as described in the first embodiment (step S54).

In the third embodiment, however, the setting data used for the write processing of data to the data memory 106 is set when the data write command is received. For this reason, the write processing is executed at step S54, on the basis of the setting data which is set at step S53, in the third embodiment. That is, the processings (steps S1–S2 and steps S4–S11) other than step S3 shown in FIG. 3 are executed as the processing of step S54.

When the above-described write processing has been terminated, the CPU 103 transmits the data indicating the result of the write processing to the card reader-writer 12, as a response to the write command (step S55). In the write processing of step S54, for example, the CPU 103 transmits the data indicating normal termination if the writing is normally terminated or the data indicating abnormal termination if the writing is abnormally terminated.

When the card reader-writer 12 receives the data indicating such a write result from the IC card 11 (step S56), the data write processing in the noncontact type IC card system is completed.

According to the third embodiment, as described above, the card reader-writer sets the setting data used for the write processing of data in the IC card, in the data write command, and transmits the data to the IC card. The IC card sets the setting data included in the write command of the data received from the card reader-writer and executes the writing of the data to the data memory of the IC card.

Therefore, the setting data used for the data write processing does not need to be stored in the IC card. As the setting data can easily be changed by using the keyboard or the like, on the card reader-writer side, the setting data which is to be set every time the write command is transmitted can easily be changed. Moreover, as the setting data can be changed on the card reader-writer side, the setting data does not need to be individually changed for each IC card and flexible operations of the noncontact type IC card system can be implemented in the system having a plurality of noncontact type IC cards.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A noncontact type IC card for use in an IC card system that includes an external device having a sending section which sends a power wave for operations to the IC card, and a transmitting section which transmits a write command to the IC card receiving the power wave for operations sent from the sending section, the IC card performing writing of data in response to a request from the external device and comprising:

a voltage detecting section configured to detect a voltage level of an operating voltage generated from the power wave received from the external device;

a first checking section configured to detect, by the voltage detecting section, the voltage level of the operating voltage and checks whether or not the detected voltage level of the operating voltage is a predetermined voltage level, when the writing of the data to the memory is started in response to the write command received from the external device;

a write executing section configured to execute the writing of the data to the memory if the first checking section determines that the detected voltage level of the operating voltage is the predetermined voltage level;

a second checking section configured to detect the voltage level of the operating voltage obtained after the writing of the data to the memory is terminated, by the voltage detecting section, and which checks whether or not the detected voltage level is a predetermined voltage level;

a control section which executes again processing of the first checking section, the write executing section, and the second checking section after waiting for a predetermined period of time, if the first checking section determines that the voltage level of the operating voltage is not the predetermined voltage level or if the second checking section determines that the voltage level of the operating voltage is not the predetermined voltage level; and a setting section configured to set the predetermined period of time in which the control section waits, in accordance with data prestored in the memory when the IC card starts by receiving the power wave for operations sent from the sending section of the external device.

2. The IC card according to claim 1, wherein the setting section sets the predetermined period of time in which the control section waits in the processing, in accordance with data representing the predetermined period of time in which the control section of the IC card waits in the processing transmitted from the transmitting section of the external device together with the data write command.

3. The IC card according to claim 1, wherein the setting section which sets a number of times at which the processing of the first checking section, the write executing section, and the second checking section are repeated in accordance with data prestored in the memory when the IC card starts by receiving the power wave for operations sent from the sending section of the external device, and the control section repeats the processing of the first checking section, the write executing section and the second checking section at the number of times which is set by the setting section.

4. The IC card according to claim 1, wherein the setting section sets a number of times at which the processing of the first checking section, the write executing section and the second checking section are repeated in accordance with data indicating the number of times at which the IC card repeats the processing of the first checking section, the write executing section and the second checking section transmitted from the transmitting section of the external device together with the data write command, and the control section repeats the processing of the first checking section, the write executing section and the second checking section at the number of times which is set by the setting section.

5. A noncontact type IC card for use in an IC card system that includes an external device having a sending section which sends a power wave for operations to the IC card, and a transmitting section which transmits a write command to the IC card receiving the power wave for operations sent from the sending section, the IC card performing writing of data in response to a request from the external device and comprising:

a rewritable nonvolatile memory;

an antenna configured to transmit data to an external device or receives the data therefrom;

a power generating section configured to receive a power wave transmitted from the external device, via the antenna, and generates an operating voltage with the received power wave;

a voltage detecting section configured to detect a voltage level of the operating voltage generated by the power generating section;

a first checking section configured to detect by the voltage detecting section the voltage level of the operating voltage generated by the power generating section and checks whether or not the detected voltage level of the operating voltage is a predetermined voltage level, when a write command of the data from the external device to the nonvolatile memory is received via the antenna;

a write executing section configured to execute the writing of the data to the nonvolatile memory if the first checking section determines that the detected voltage level of the operating voltage is the predetermined voltage level;

a second checking section configured to detect the voltage level of the operating voltage obtained after the writing of the data to the nonvolatile memory executed by the write executing section is terminated, by the voltage detecting section, and which checks whether or not the detected voltage level is a predetermined voltage level;

a control section which executes again processing of the first checking section, the write executing section, and the second checking section after waiting for a predetermined period of time, if the first checking section determines that the voltage level of the operating voltage is not the predetermined voltage level or if the second checking section determines that the voltage level of the operating voltage is not the predetermined voltage level; and a setting section which sets the predetermined period of time in which the control section waits, in accordance with data prestored in the memory when the IC card starts by receiving the power wave for operations sent from the sending section of the external device.

6. The IC card according to claim 5, wherein the setting section sets the predetermined period of time in which the control section waits in the processing, in accordance with data representing the predetermined period of time in which the control section of the IC card waits in the processing transmitted from the transmitting section of the external device together with the data write command.

7. The IC card according to claim 5, wherein the setting section sets a number of times at which the processing of the first checking section, the write executing section and the second checking section are repeated in accordance with data prestored in the memory when the IC card starts by receiving the power wave for operations sent from the sending section of the external device, and the control section repeats the processing of the first checking section, the write executing section and the second checking section at the number of times which is set by the setting section.

8. The IC card according to claim 5, wherein the setting section sets a number of times at which the processing of the first checking section, the write executing section and the second checking section are repeated in accordance with data transmitted indicating the number of times at which the IC card repeats the processings of the first checking section from the transmitting section of the external device together with the data write command, and the control section repeats the processing of the first checking section, the write executing section and the second checking section at the number of times which is set by the setting section.

* * * * *